United States Patent
Fan et al.

(10) Patent No.: US 10,229,335 B2
(45) Date of Patent: Mar. 12, 2019

(54) DISPLAYING THE MEANING OF SELECTED TEXT

(71) Applicant: International Business Machines Corporation, Armonk, NY (US)

(72) Inventors: Si B. Fan, Beijing (CN); Chen Jiang, Beijing (CN); Qin Li, Beijing (CN); Jun T. Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 14/628,349

(22) Filed: Feb. 23, 2015

(65) Prior Publication Data

US 2015/0278622 A1    Oct. 1, 2015

(30) Foreign Application Priority Data

Mar. 26, 2014    (CN) .......................... 2014 1 0116776

(51) Int. Cl.
*G06K 9/20* (2006.01)
*G06F 17/27* (2006.01)

(52) U.S. Cl.
CPC ........ *G06K 9/2054* (2013.01); *G06F 17/2765* (2013.01); *G06K 9/2081* (2013.01)

(58) Field of Classification Search
CPC ...... G06K 9/20; G06K 9/2054; G06K 9/2081; G06F 17/27; G06F 17/2765
See application file for complete search history.

(56) References Cited

U.S. PATENT DOCUMENTS

| | | | |
|---|---|---|---|
| 6,325,630 B1 | 12/2001 | Grabmayr | |
| 6,675,010 B1 | 1/2004 | Yeh | |
| 7,783,986 B2 * | 8/2010 | Barsness | G06F 17/241 |
| | | | 715/776 |
| 8,254,729 B1 * | 8/2012 | Chan | G06Q 10/10 |
| | | | 382/218 |
| 8,484,297 B2 * | 7/2013 | Huang | G06F 17/241 |
| | | | 709/206 |
| 8,706,685 B1 * | 4/2014 | Smith | G06F 17/30882 |
| | | | 707/608 |
| 8,744,855 B1 * | 6/2014 | Rausch | G06F 17/27 |
| | | | 235/375 |

(Continued)

FOREIGN PATENT DOCUMENTS

| | | |
|---|---|---|
| CN | 10212945 A | 7/2011 |
| CN | 102609408 A | 7/2012 |

(Continued)

OTHER PUBLICATIONS

Application No. 201410116776.X (China), titled "A Method and System for Information Processing," filed on Mar. 26, 2014.

(Continued)

*Primary Examiner* — Asher D Kells
(74) *Attorney, Agent, or Firm* — Anthony R. Curro (57) ABSTRACT

A method, computer program product, and system for information processing. A piece of text on user's current screen is received. An entry record of the user from a knowledge repository is read, the entry record at least including entry name and meaning of the entry name. Text among the piece of text on the user's current screen which is consistent with the entry name in the entry record is highlighted. The meaning of the entry name is then displayed.

12 Claims, 3 Drawing Sheets

(56) References Cited

U.S. PATENT DOCUMENTS

| | | | | |
|---|---|---|---|---|
| 8,799,765 | B1* | 8/2014 | MacInnis | G06F 17/241 715/230 |
| 8,803,817 | B1* | 8/2014 | Froment | G06F 3/0488 345/1.1 |
| 9,195,640 | B1* | 11/2015 | Donneau-Golencer | G06F 17/28 |
| 9,251,130 | B1* | 2/2016 | Lynnes | G06F 17/241 |
| 2006/0156222 | A1* | 7/2006 | Chi | G06F 17/241 715/231 |
| 2007/0055926 | A1* | 3/2007 | Christiansen | G06F 17/241 715/210 |
| 2007/0192687 | A1* | 8/2007 | Simard | G06K 9/00442 715/234 |
| 2008/0088604 | A1* | 4/2008 | Cohen | G06F 3/002 345/179 |
| 2008/0168073 | A1* | 7/2008 | Siegel | G06F 17/3002 |
| 2009/0073501 | A1* | 3/2009 | Gutarin | G06F 17/30722 358/403 |
| 2010/0030859 | A1* | 2/2010 | Huang | G06F 17/241 709/206 |
| 2010/0266999 | A1 | 10/2010 | Follansbee et al. | |
| 2010/0269071 | A1* | 10/2010 | Bhide | G06Q 10/10 715/846 |
| 2011/0261030 | A1* | 10/2011 | Bullock | G06F 15/0283 345/204 |
| 2012/0030558 | A1* | 2/2012 | Chiu | G06F 17/241 715/233 |
| 2012/0036423 | A1* | 2/2012 | Haynes, II | G06F 17/241 715/230 |
| 2012/0078612 | A1* | 3/2012 | Kandekar | G06F 17/2745 704/9 |
| 2012/0078613 | A1* | 3/2012 | Kandekar | G06F 17/2745 704/9 |
| 2012/0079372 | A1* | 3/2012 | Kandekar | G06F 17/2745 715/256 |
| 2013/0067333 | A1* | 3/2013 | Brenneman | G06F 17/30796 715/721 |
| 2013/0189654 | A1 | 7/2013 | Symmes et al. | |
| 2014/0089775 | A1* | 3/2014 | Worsley | G06F 17/30575 715/230 |
| 2014/0101527 | A1* | 4/2014 | Suciu | G06F 17/218 715/230 |
| 2014/0164900 | A1* | 6/2014 | Zeng | G06F 17/241 715/230 |
| 2014/0379707 | A1* | 12/2014 | Givoni | G06F 17/30014 707/726 |
| 2015/0046782 | A1* | 2/2015 | O'Donoghue | G06F 17/211 715/205 |
| 2015/0046783 | A1* | 2/2015 | O'Donoghue | G06F 17/2235 715/205 |
| 2015/0074127 | A1* | 3/2015 | Cherwinka | G06F 17/30994 707/755 |
| 2015/0370453 | A1* | 12/2015 | Kandekar | G06F 17/2745 715/810 |

FOREIGN PATENT DOCUMENTS

| | | |
|---|---|---|
| CN | 103455524 A | 12/2013 |
| WO | 2005098605 A2 | 10/2005 |

OTHER PUBLICATIONS

Walters et al., "The effect of keeping vocabulary notebooks on vocabulary acquisition," Language Teaching Research, 2009, vol. 13, No. 4, pp. 403-423.

Schmitt et al., "Vocabulary notebooks: theoretical underpinnings and practical suggestions," ELT Journal, Apr. 1995, vol. 49 No. 2, pp. 133-143, Oxford University Press.

Troute, "Oral Language and Vocabulary Development Activities for Student-Student Interaction," Department of Multicultural Education, School District of Palm Beach County, FL, http://www.palmbeachschools.org/multicultural/documents/Oral-LanguageDevelopmentActivities.pdf, Accessed on Feb. 2, 2015.

Wu et al., "Supporting collocation learning with a digital library," Computer Assisted Language Learning, vol. 23, No. 1, Feb. 2010, pp. 87-110.

Xiangzhen et al., "Structural Design and Implementation of Tibetan-English-Chinese Electronic Dictionary", H. Kim (Ed.): Advances in Technology and Management, AISC 165, pp. 497-504, springlink.com, Springer-Verlag Berlin Heidelberg, 2012. (Also cited as "The Design of Functional Structure and System Implementation for Tibetan-English-Chinese Electronic Talking Dictionary", J. Changchun Inst. Tech. (Nat.Sci.Edi,), 2010, vol. 11, No. 1, 4 pages.

"The Analysis and design of the browser page aided reading system", 07R0446, Beijing University of Posts and Telecommunications, Oct. 2012, pp. 1-63.

* cited by examiner

DISPLAYING THE MEANING OF SELECTED TEXT

BACKGROUND

The present invention relates generally to the field of data processing, and specifically, to a computer implemented method and system for information processing.

In the prior art, user knowledge repositories are widely used in information processing. However, in the prior art solutions for information processing by using a knowledge repository, efficiency of information transfer is not very high. Therefore, there is a need for a method and system capable of efficiently processing information to improve efficiency of information transfer.

SUMMARY

Embodiments of the present invention disclose a method, computer program product, and system for information processing. A piece of text on user's current screen is received. An entry record of the user from a knowledge repository is read, the entry record at least including entry name and meaning of the entry name. Text among the piece of text on the user's current screen which is consistent with the entry name in the entry record is highlighted. The meaning of the entry name is then displayed.

DETAILED DESCRIPTION

Some exemplary embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure.

Figure 1:
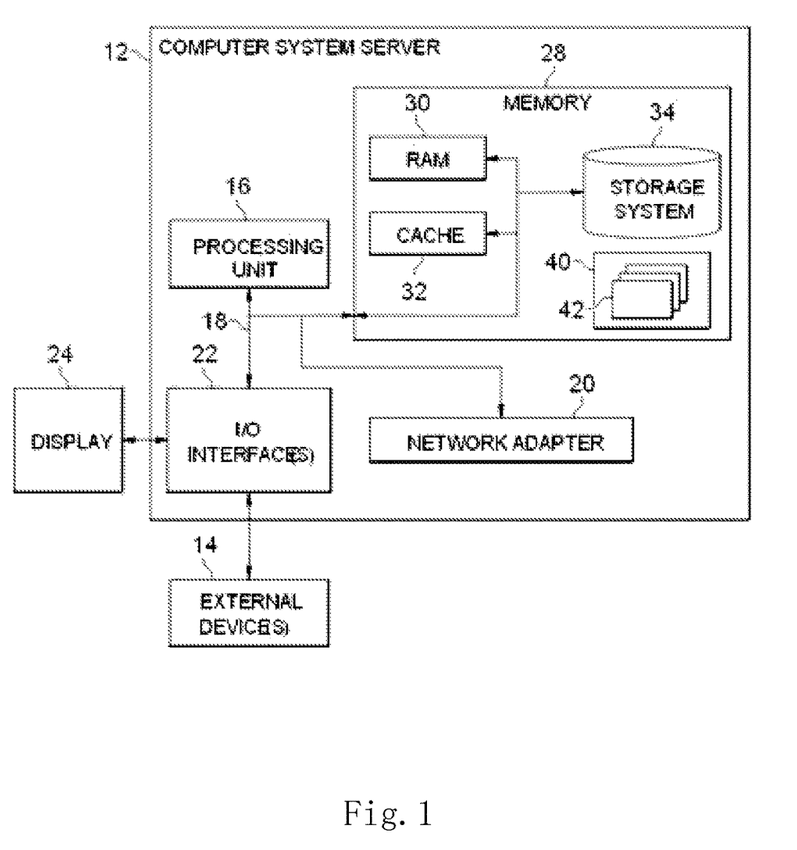
FIG. 1 shows a block diagram of an exemplary computer system/server according to one embodiment of the present invention.

Referring now to FIG. 1, a block diagram of an exemplary computer system/server 12 which is applicable to implement an embodiment of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In addition to conventional computer system/server 12 shown in FIG. 1, mobile devices may also be included for achieving embodiments of the invention, including but not limited to, mobile telephone, PDA, tablet computer and others. Typically, a mobile device has an input device, including but not limited to, touch input device, such as, touch screen, touch panel and others.

Figure 2:
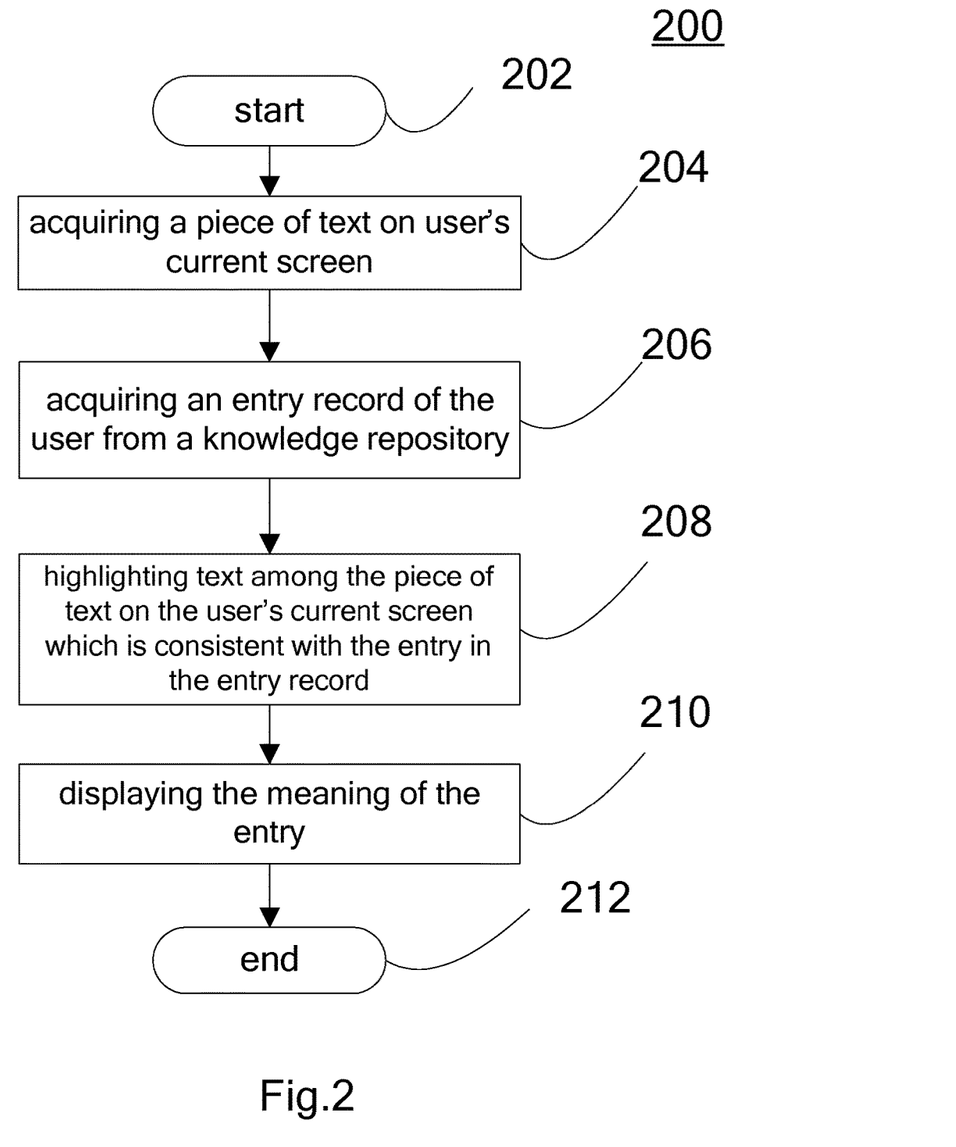
FIG. 2 shows a flowchart of a method for information processing according to one embodiment of the present invention.

Now referring to FIG. 2, a flowchart of a method 200 for information processing according to one embodiment of the present invention is shown, the method 200 for information processing according to one embodiment of the present invention starts from the step 202.

Next, the method proceeds to the step 204: receiving a piece of text on user's current screen. According to one embodiment of the invention, the piece of text on the user's current screen may be received by directly reading text on the screen. According to one embodiment of the invention, the text on the user's current screen may be received by receiving text in a file to be displayed on the current screen. According to one embodiment of the invention, the text on the user's current screen may also be received, for example, through OCR software recognition. Here, the text may be a character string in any form, and may be encoded in ASCII code, Unicode or any suitable form.

Next, the method proceeds to the step 206: reading an entry record of the user from a knowledge repository, wherein the entry record at least including entry name and meaning of the entry name. Table 1 below illustratively shows a form of the entry record of the user in the knowledge repository.

TABLE 1

| Entry Name | Meaning Of Entry Name | Date Of Creation | Similarity | Owner | Relationship With Owner |
|---|---|---|---|---|---|
| Saas | Software as a Service | 2013-01-27 | 4 | Chris | Related To Simon |
| Cics | Customer Information Control System | 2012-11-30 | 1 | Chris | Related To Simon |
| Infrastructure | Infrastructure | 2013-04-18 | 2 | Simon | Related To Chris |
| Portfolio | Investment Combination | 2012-12-02 | 0 | Jimmy | Related To Jacky |
| Acquisition | Merge | 2012-08-07 | 2 | Jacky | Related To Jimmy |
| . . . | . . . | . . . | . . . | . . . | . . . |

According to Table 1, an entry record in the knowledge repository includes the following.

Entry name: name of the entry record.

Meaning of entry name: meaning corresponding to name of the entry record.

Date of creation: date on which the entry record is created.

Similarity: similarity to the entry name.

Owner: owner of the entry record.

Relationship with owner: relationship between owner of that entry record and owner of other entry record.

It is appreciated that Table 1 merely illustratively shows content of an entry record in a knowledge repository. According to one embodiment of the invention, an entry record in the knowledge repository at least includes entry name and meaning of the entry name. According to one embodiment of the invention, an entry record in the knowledge repository may only include entry name and meaning of the entry name. According to one embodiment of the invention, an entry record in the knowledge repository may include more content that is not shown.

Next, the method 200 proceeds to the step 208: highlighting text among the piece of text on the user's current screen which is consistent with the entry name in the read entry record. According to one embodiment of the invention, the entry record further includes similarity to the entry name, for example, as shown in Table 1, similarity to the entry name may be represented by a numeral value, the larger the value, the more similar to the entry name. Of course, it is also possible that, the smaller the value, the more similar to the entry name. According to one embodiment of the invention, the method 200 further comprises: highlighting text among the piece of text on the user's current screen which is consistent with the entry name in the read entry record according to a display pattern associated with the similarity to the entry name. For example, if value of the similarity to the entry name is small, then the text among the piece of text on the user's current screen which is consistent with the entry name in the read entry record is highlighted with darker color, if value of the similarity to the entry name is large, then the text among the piece of text on the user's current screen which is consistent with the entry name in the read entry record is highlighted with brighter color, or vice versa. According to one embodiment of the invention, when the similarity to the entry name is larger or smaller than a threshold, then the text among the piece of text on the user's current screen which is consistent with the entry name in the read entry record will not be highlighted. According to one embodiment of the invention, the method 200 further comprises: receiving an input from the user for changing the similarity to the entry name in the read entry record; and instructing to change the similarity to the entry name. Changing of similarity to the entry name may be implemented by increasing or decreasing its corresponding value.

Next, the method 200 proceeds to the step 210: displaying the meaning of the entry name in the read entry record. According to one embodiment of the invention, the step of displaying the meaning of the entry name in the read entry record is performed in response to an action of the user, and the action of the user includes any one of: clicking the text which is consistent with the entry name in the read entry record; hovering pointer of a mouse over a display area of the text which is consistent with the entry name in the reader entry record; and selecting the text which is consistent with the entry name in the read entry record.

Next, the method 200 proceeds to the step 212 where it is ended.

According to one embodiment of the invention, the method 200 may further comprises: receiving a request from the user for adding selected text into the knowledge repository, and instructing to add an entry record corresponding to the selected text into the knowledge repository. The added entry record may be, for example, the entry record as shown in Table 1. According to one embodiment of the invention, the method 200 may further comprises: reading an entry record of other user related to the user from the knowledge repository, highlighting text among the piece of text on the user's current screen which is consistent with entry name in the entry record of the other user, and displaying meaning of the entry name in the entry record of the other user. By correlating current user to other user, the purpose of sharing the knowledge repository of other user with current user may be achieved. Here, correlation could be that, the user and the other user belong to same or similar technical field, or the user and the other user has same or similar working responsibility, or correlation in any form and with any content.

Figure 3:
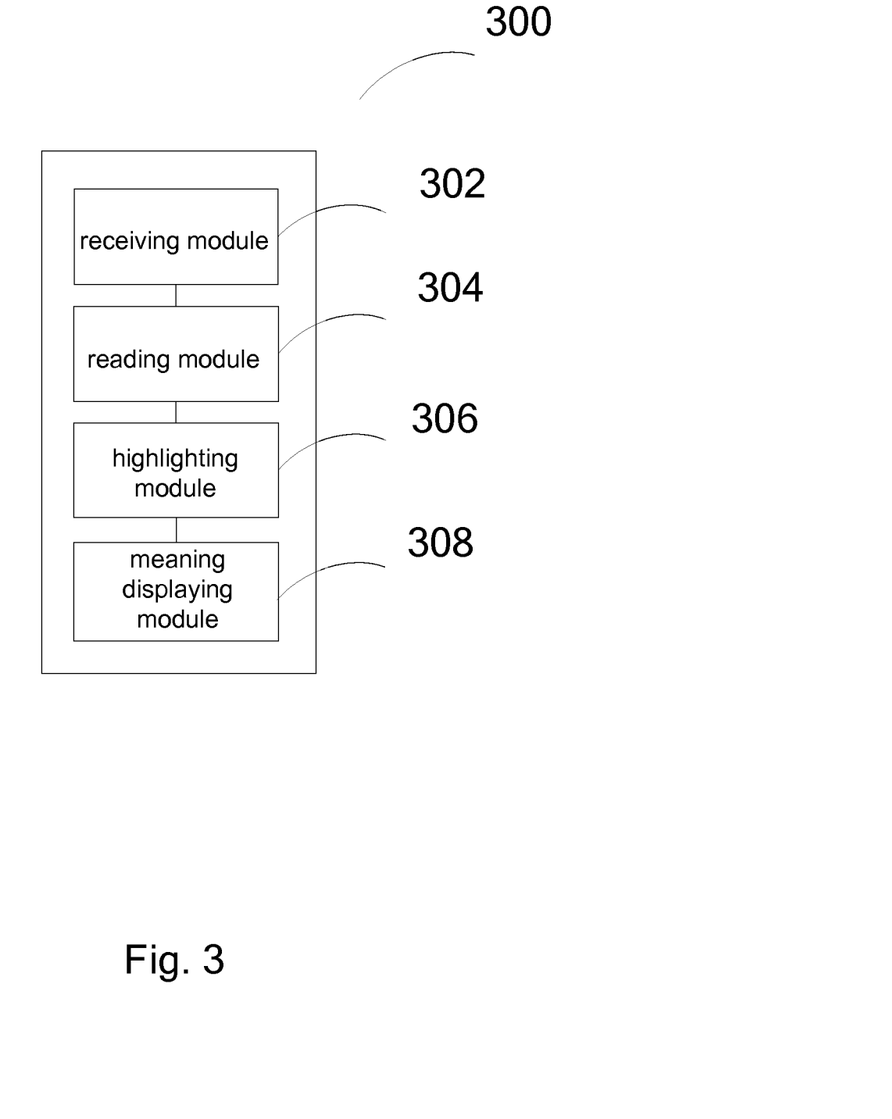
FIG. 3 shows a block diagram of a system for information processing according to one embodiment of the present invention.

Next, a system 300 for information processing according to one embodiment of the invention will be described with reference to FIG. 3. The system 300 for information processing according to one embodiment of the present invention comprising:

an receiving module 302 configured to receive a piece of text on user's current screen;

a reading module 304 configured to read an entry record of the user from a knowledge repository, the entry record at least including entry name and meaning of the entry name;

a highlighting module 306 configured to highlight text among the piece of text on the user's current screen which is consistent with the entry name in the entry record;

a meaning displaying module 308 configured to display the meaning of the entry name.

According to one embodiment of the invention, wherein the meaning displaying module 308 displays the meaning of the entry name in response to an action of the user, and the action of the user includes any one of: clicking the text which is consistent with the entry name in the entry record; hovering pointer of a mouse over a display area of the text which is consistent with the entry name in the entry record; and selecting the text which is consistent with the entry name in the entry record.

According to one embodiment of the invention, wherein the entry record further includes similarity to the entry name, and the highlighting module is further configured to: highlight text among the piece of text on the user's current screen which is consistent with the entry name in the entry record according to a display pattern associated with the similarity to the entry name.

According to one embodiment of the invention, the system 300 further comprises: a receiving module (not shown) configured to receive an input from the user for changing the similarity to the entry name; and an instructing module (not shown) configured to instruct to change the similarity to the entry name.

According to one embodiment of the invention, the system 300 further comprises: a receiving module (not shown) configured to receive a request from the user for adding selected text into the knowledge repository; and an instructing module (not shown) configured to instruct to add an entry record corresponding to the selected text into the knowledge repository.

According to one embodiment of the invention, wherein, the reading module 304 is further configured to read an entry record of other user related to the user from the knowledge repository; the highlighting module 306 is further configured to highlight text among the piece of text on the user's current screen which is consistent with entry name in the entry record of the other user, and the meaning displaying module 308 is further configured to display meaning of the entry name in the entry record of the other user.

According to one embodiment of the invention, wherein, the receiving module 302 receives the text on the user's current screen by receiving text in a file to be displayed on the current screen.

A method and system for information processing according to embodiments of the invention have been described above in conjunction with accompany drawings. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for information processing, comprising:
receiving through optical character recognition, by a user's computer, a file that contains text and encoding the text in ASCII code or Unicode;
displaying, by the user's computer, the text on a display screen of the computer;
reading an entry record of the user, and an entry record of another user that is indicated as related to the user, from a knowledge repository, each entry record at least including an entry name, a meaning of the entry name, a date of creation, a similarity to the entry name represented by a numerical value, an owner, and a relationship with the owner;
highlighting text among the displayed text on the user's current screen which is consistent with the entry name in the entry records according to a display pattern based on the numerical value of the similarity read from the knowledge repository of the text to the entry name, text highlighted darker to indicate a low numerical value with low similarity and lighter to indicate a higher numerical value with high similarity; and
displaying the meanings of the entry name in response to an action of the user that includes any one of: clicking the text which is consistent with the entry name in the entry record, hovering a pointer of a mouse over a display area of the text which is consistent with the entry name in the entry record, and selecting the text which is consistent with the entry name in the entry record.

2. The method according to claim 1, further comprising:
receiving an input from the user for changing the similarity to the entry name;
instructing to change the similarity to the entry name by increasing or decreasing the numerical value of the similarity.

3. The method according to claim 1, further comprising:
receiving a request from the user for adding selected text into the knowledge repository;
instructing to add an entry record corresponding to the selected text into the knowledge repository, the entry record added corresponding to the selected text including the entry name, the meaning of the entry name, the date of creation, the similarity of the entry name represented by the numerical value, the owner, and the relationship with the owner.

4. The method according to claim 1, further comprising:
reading an entry record of other user related to the user from the knowledge repository, the user and the other user belonging to a same technical field;

highlighting text among the piece of text on the user's current screen which is consistent with entry name in the entry record of the other user; and displaying meaning of the entry name in the entry record of the other user to share the knowledge repository with the other user.

5. A computer system for information processing, the computer system comprising:

one or more computer processors, one or more computer-readable storage media, and program instructions stored on one or more of the computer-readable storage media for execution by at least one of the one or more processors, the program instructions comprising:

program instructions to receive through optical character recognition, on a user's computer, a file that contains text and encoding the text in ASCII code or Unicode;

program instructions to display the text on a display screen of the user's computer;

program instructions to read an entry record of the user, and an entry record of another user that is indicated as related to the user, from a knowledge repository, each entry record at least including an entry name, a meaning of the entry name, a date of creation, a similarity to the entry name represented by a numerical value, an owner, and a relationship with the owner;

program instructions to highlight text among the displayed text on the user's current screen which is consistent with the entry name in the entry record according to a display pattern based on the numerical value of the similarity read from the knowledge repository of the text to the entry name, text highlighted darker to indicate a low numerical value with low similarity and lighter to indicate a higher numerical value with high similarity; and program instructions to display the meanings of the entry name, in response to an action of the user that includes any one of: clicking the text which is consistent with the entry name in the entry record, hovering a pointer of a mouse over a display area of the text which is consistent with the entry name in the entry record, and selecting the text which is consistent with the entry name in the entry record.

6. The computer system according to claim 5, further comprising:

program instructions to receive an input from the user for changing the similarity to the entry name; and program instructions to change the similarity to the entry name by increasing or decreasing the numerical value of the similarity.

7. The computer system according to claim 5, further comprising:

program instructions to receive a request from the user for adding selected text into the knowledge repository; and program instructions to instruct to add an entry record corresponding to the selected text into the knowledge repository, the entry record added corresponding to the selected text including the entry name, the meaning of the entry name, the date of creation, the similarity of the entry name represented by the numerical value, the owner, and the relationship with the owner.

8. The computer system according to claim 5, wherein:

the program instructions to read an entry record further comprises program instructions to read an entry record of other user related to the user from the knowledge repository, the user and the other user belonging to a same technical field;

the program instructions to highlight text further comprises program instructions to highlight text among the piece of text on the user's current screen which is consistent with entry name in the entry record of the other user; and the program instructions to display the meaning of the entry name further comprises program instructions to display meaning of the entry name in the entry record of the other user to share the knowledge repository with the other user.

9. A computer program product for information processing, the computer system comprising:

one or more non-transitory computer-readable storage media and program instructions stored on the one or more non-transitory computer-readable storage media, the program instructions comprising:

program instructions to receive through optical character recognition, on a user's computer, a file that contains text and encoding the text in ASCII code or Unicode;

program instructions to display the text on a display screen of the user's computer;

program instructions to read an entry record of the user, and an entry record of another user that is indicated as related to the user, from a knowledge repository, each entry record at least including an entry name, a meaning of the entry name, a date of creation, a similarity to the entry name represented by a numerical value, an owner, and a relationship with the owner;

program instructions to highlight text among the displayed text on the user's current screen which is consistent with the entry name in the entry record according to a display pattern based on the numerical value of the similarity read from the knowledge repository of the text to the entry name, text highlighted darker to indicate a low numerical value with low similarity and lighter to indicate a higher numerical value with high similarity; and program instructions to display the meanings of the entry name, in response to an action of the user that includes any one of: clicking the text which is consistent with the entry name in the entry record, hovering a pointer of a mouse over a display area of the text which is consistent with the entry name in the entry record, and selecting the text which is consistent with the entry name in the entry record.

10. The computer program product according to claim 9, further comprising:

program instructions to receive an input from the user for changing the similarity to the entry name; and program instructions to change the similarity to the entry name by increasing or decreasing the numerical value of the similarity.

11. The computer program product according to claim 9, further comprising:

program instructions to receive a request from the user for adding selected text into the knowledge repository; and program instructions to instruct to add an entry record corresponding to the selected text into the knowledge repository, the entry record added corresponding to the selected text including the entry name, the meaning of the entry name, the date of creation, the similarity of the entry name represented by the numerical value, the owner, and the relationship with the owner.

12. The computer program product according to claim 9, wherein:

the program instructions to read an entry record further comprises program instructions to read an entry record of other user related to the user from the knowledge repository, the user and the other user belonging to a same technical field;

the program instructions to highlight text further comprises program instructions to highlight text among the piece of text on the user's current screen which is consistent with entry name in the entry record of the other user; and the program instructions to display the meaning of the entry name further comprises program instructions to display meaning of the entry name in the entry record of the other user to share the knowledge repository with the other user.

\* \* \* \* \*